Jan. 23, 1934.    H. K. FAIRALL    1,944,228
CAMERA SHUTTLE
Original Filed Feb. 25, 1928    2 Sheets-Sheet 1
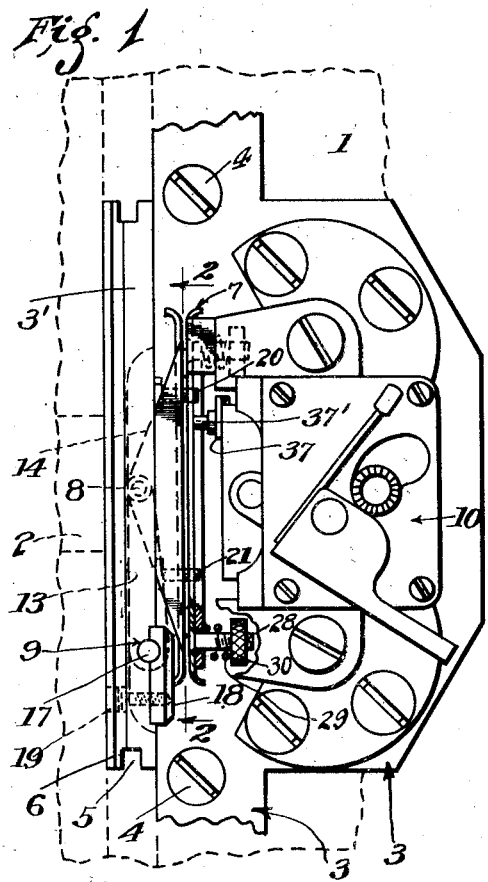
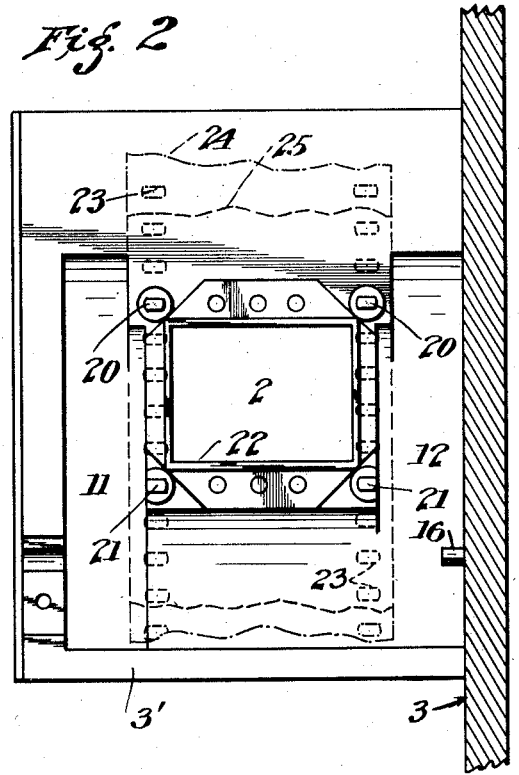
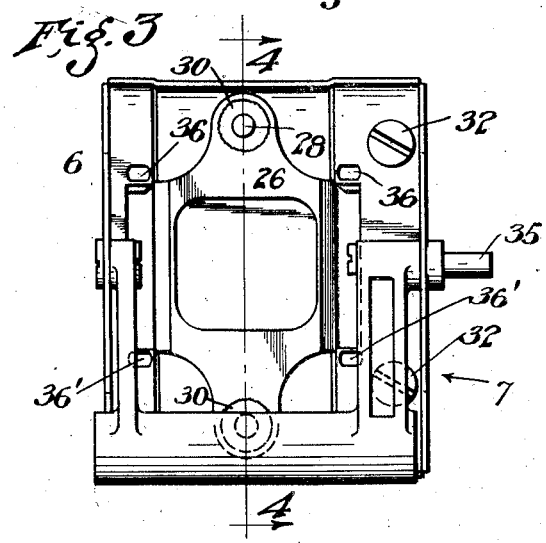
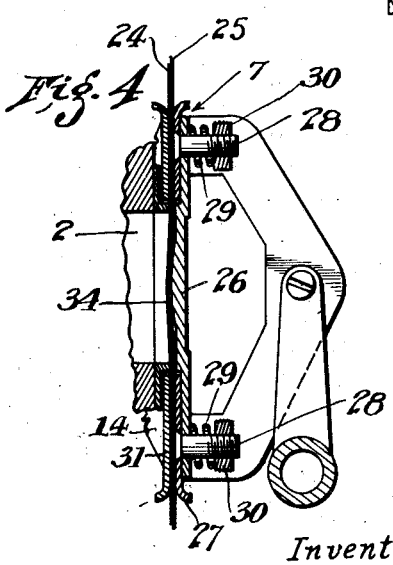
Inventor.
Harry K. Fairall
By ... Attorney.

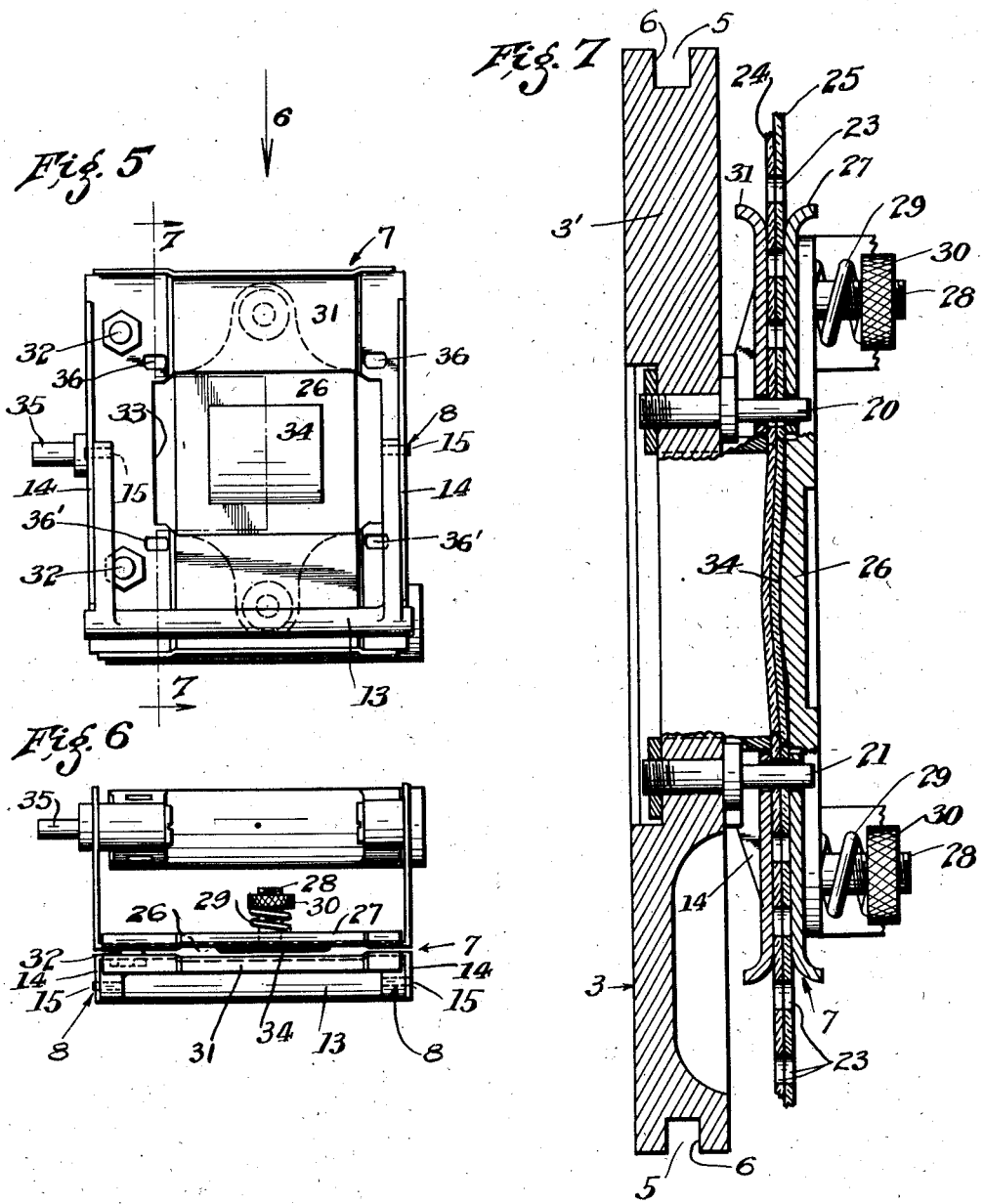

Patented Jan. 23, 1934

1,944,228

UNITED STATES PATENT OFFICE 1,944,228

CAMERA SHUTTLE

Harry K. Fairall, Hollywood, Calif., assignor, by mesne assignments, to Harriscolor Films, Inc., Jersey City, N. J., a corporation of New Jersey Application February 25, 1928, Serial No. 256,893
Renewed July 3, 1933

5 Claims. (Cl. 88—17)

This invention relates particularly to camera shuttles adapted to be used in the taking of colored motion pictures.

An object of my invention is to provide a novel and simple camera shuttle adapted for use in taking motion pictures that will reproduce the images in their natural colors.

I have found that a convenient method of taking motion pictures adapted to reproduce the natural colors of the images taken is to simultaneously run through the camera two strips of specially treated film, which is more particularly referred to and claimed in the copending application of Joseph B. Harris, Jr., filed March 15, 1928, Serial No. 261,820, and to simultaneously expose such strips, and an object of my invention is to provide a novel and simple shuttle adapted to hold both of said strips of film in contact with each other during successive exposures.

A further object of my invention is to provide novel and simple means whereby two strips of film may be simultaneously held in focus, so that an exposure may be simultaneously made upon both of said strips of film, and thus practically eliminate distortion of the imprints thereon.

My invention includes the parts and combinations of parts more particularly hereinafter referred to.

Other objects, advantages and features of invention may appear from the accompanying drawings, the subjoined detail description and the appended claims.

The accompanying drawings illustrate the invention in a form I at present deem preferable.

Figure 1 is a side elevation of a camera shuttle constructed in accordance with my invention as secured in place in the camera frame of a cinematograph camera, a fragment of which is shown in dot and dash lines. Parts of the shuttle assembly are broken away to contract the view; other parts are broken away to more clearly show the construction.

Fig. 2 is a transverse sectional view taken on line 2—2, Fig. 1 looking in the direction of the arrows. Strips of motion picture film are illustrated in dotted and dot and dash lines.

Fig. 3 is a detached detail view of the film tightening or contact block or device and assembly as viewed from the right hand side of Fig. 1.

Fig. 4 is a fragmental sectional view of the film contact block and associated parts taken on a plane indicated by line 4—4, Fig. 3.

Fig. 5 is a detached detail view of the film tightening block as viewed from the reverse side of Fig. 3.

Fig. 6 is a detail view of the film contact device assembly as viewed from the top of Fig. 5.

Fig. 7 is a transverse sectional view, on enlarged scale, of the aperture plate, pilot pins, and a fragment of the register leaf and film contact block as viewed on line 7—7, Fig. 5, looking in the direction of the arrows.

The main camera frame 1 is provided with the usual photographing or exposing aperture 2, through which the image is projected from the usual camera lens, not shown.

A shuttle mounting bracket 3 is detachably secured to the frame 1 by any suitable means, such as screws 4 and the tongue and groove connection 5, 6 provided at the upper and lower edges of the aperture plate 3' of the bracket 3.

The camera shuttle mechanism includes a register leaf 7 that forms the guideway for the film before the exposing aperture 2, and is detachably mounted for rocking or oscillating movement upon the bracket 3 as at its pivotal connections 8, 9. This construction is well known in the art and for the sake of brevity will not be gone into in detail.

Film releasing mechanism 10 is provided to hold the register leaf away from the aperture plate 3' and pilot register pins to permit easy insertion or removal of film from the register leaf.

The aperture plate 3' is provided with recesses or grooves 11, 12 to receive the rocker arm link 13 which is connected as at 15 to the register leaf or shuttle guide or stripper member 14 and to the shuttle mounting bracket 3 by means of the stud 16 and pin 17 that form the pivotal connection 9. The pin 17 is secured to the aperture plate 3' by means of a clamp member 18 that is held in place by a screw 19.

My invention comprises providing in conjunction with the usual locating or pilot register pins 20 that are mounted above and in fixed relation to the aperture plate 3', film retaining pins 21 located below and at each corner of the exposing aperture 2 formed in the aperture plate 3'. The pins 20 and 21 are adapted to be received in the usual film perforations or sprocket holes 23 formed in the films 24, 25 that are simultaneously run through the register leaf 7 past the exposing aperture 2. A film tightening or contact block or pressure plate 26 is resiliently supported on the inner guide member 27 of register leaf 7 by means of posts 28 that extend therefrom and through the film tightening block 26. Springs 29 encircle the posts 28 and operate between the plate 26 and nuts 30 screwed on the posts 28 to resiliently hold the plate 26 against member 27. The nuts 30 may be adjusted on the posts 28 and provide means for varying the tension on springs 29 to obtain a predetermined pressure on, or tightening of, the film when the same is brought to register before the exposing aperture 2.

The guide member 27 is spaced from the outer guide member 31 of register leaf 7 by spacing members 32 mounted at one side of the members 27, 31 and the exposing aperture 2 thereby providing a construction which permits the film to be easily threaded into the register leaf by merely slipping the same between the guide members through the open side opposite the spacing members 32 as is common in the art.

The guide members 27, 31 are provided with openings 33 to permit exposure of the film. A protuberance or projection 34 formed on the outer surface of the tightening block 26, extends forwardly through the openings 33 to engage the film when the register leaf is moved forwardly to bring the film into register before the exposing aperture, and against the rearward surface of the aperture plate. The register leaf is moved forward and backward by the usual cam mechanism (not shown) that engages the stub shaft 35. Orifices 36, 36' formed respectively in the members 27, 31 are adapted to receive the pilot register pins 20 and the film retaining pins 21.

In operation, the films 24, 25 are threaded through the register leaf 7 in the usual manner and as the camera is operated, the leaf 7 is moved forward and backward, toward and away from the exposing aperture 2 by the usual means operating upon the stub shaft 35, and the films 24, 25 are accurately registered before the exposing aperture 2 by the pilot register pins 20, one of which is of sufficient size to snugly fit the openings 23 in the films 24, 25. The film retaining pins 21 also guide the films and prevent the same from being thrown out of focus as will more fully hereinafter be set forth.

The films are moved in successive steps past the exposing aperture 2 by the usual traveling arm or shuttle bar 37 carrying the engaging pins 37' which impart the feeding motion to the films, and which bar 37 is operated by the usual cam mechanism, not shown.

As the tightening block 26 is moved against the films 24, 25, the protuberance or projection 34 will engage the rear film 25 and force the same against the film 24 and tends to force both films forwardly through the exposing aperture 2 so as to hold the two strips of film in close contact one with the other, this insures correct focus of both films and likelihood of distortion of the image imprinted on the film when the same is exposed is reduced to a minimum.

During this action the protuberance tends to force the film outwardly and there may be a tendency to force the film too far through the exposing aperture 2, and thus throw the films out of focus, however, the pilot register pins 20, and the film retaining pins 21, engaging all four corners of the section of film around the picture square at the exposing aperture 2, prevents the tightening block 26 from forcing an excessive amount of film into the picture aperture so that the function of the protuberance on the tightening block is merely to force and hold the two strips of film in close contact with one another. It is found in practice that it is necessary when the apparatus is used to move two film layers simultaneously past the exposing aperture, that the film retaining pins 21 be located on the stationary element rather than on the movable element, in order to secure perfect pictures. The spring mounting of the film contact plate will permit any excessive pressure of the protuberance against the film to be taken up without likelihood of tearing the film.

The protuberance on the tightening block 26 tends to slightly curve the films, as is exaggeratively shown in Fig. 4. However, this curvature is so slight that the films are not thrown out of focus, and there is no distortion of the exposure occasioned thereby.

I claim:

1. In a camera shuttle, a register leaf adapted to simultaneously receive two strips of film; means resiliently mounted on said register leaf adapted to force and hold both strips of film in close contact one with the other, a stationary support; and pins fixed to said support to insure correct focus of both films before the exposing aperture, and means to operate said register leaf to advance the film.

2. In a camera shuttle, an aperture plate having an exposing aperture; a register leaf having spaced guide members; posts extending from one of said members; a film contact plate slidably mounted on said posts; and means extending from the film engaging surface of said film contact plate adapted to slightly force the film into the exposing aperture.

3. In a camera shuttle, a register leaf having spaced guide members; posts extending from one of said guide members; a film contact plate slidably mounted on said posts; nuts screwed onto said posts; springs operating between said nuts and contact plate to resiliently hold said contact plate on said register leaf; and a protuberance on said contact plate to engage film threaded through said register leaf, said nuts being adjustable to vary the tension of said springs.

4. In a camera shuttle, the combination of an aperture plate having an exposing aperture; pilot register pins in fixed relation to said exposing aperture; a register leaf; a film contact plate resiliently mounted on said register leaf; and a protuberance extending from said contact plate adapted to engage film in rear of said exposing aperture; said pilot pins preventing said protuberance from forcing said film out of focus when said film is brought to register before said exposing aperture.

5. In a camera shuttle, the combination of an aperture plate having an exposing aperture; pilot register pins in fixed relation to said exposing aperture; a register leaf; and a protuberance resiliently mounted on said register leaf adapted to engage film in rear of said exposing aperture; said pilot pins preventing said protuberance from forcing said film out of focus when said film is brought to register before said exposing aperture.

HARRY K. FAIRALL.